(12) United States Patent
Chang

(10) Patent No.: US 8,604,358 B2
(45) Date of Patent: Dec. 10, 2013

(54) INNER WIRE FOR INVERTER

(76) Inventor: Wan-Yu Chang, New Taipei (TW)

(*) Notice: Subject to any disclaimer, the term of this patent is extended or adjusted under 35 U.S.C. 154(b) by 312 days.

(21) Appl. No.: 13/227,722

(22) Filed: Sep. 8, 2011

(65) Prior Publication Data

US 2013/0065431 A1 Mar. 14, 2013

(51) Int. Cl.
*H01R 13/648* (2006.01)

(52) U.S. Cl.
USPC ......... 174/261; 174/72 R; 174/44; 174/50.52; 361/785; 361/752; 439/76.1

(58) Field of Classification Search
USPC ......... 174/250, 261, 72 R, 72 A, 17 R, 50.52, 174/44, 376, 359; 361/730, 733, 752, 753, 361/784, 785; 439/527, 76.1, 96
See application file for complete search history.

(56) References Cited

U.S. PATENT DOCUMENTS

| | | | |
|---|---|---|---|
| 2008/0166900 A1* | 7/2008 | Chang | 439/76.1 |
| 2010/0315752 A1* | 12/2010 | Rabu et al. | 361/103 |
| 2011/0136353 A1* | 6/2011 | Spitaels et al. | 439/95 |
| 2012/0307436 A1* | 12/2012 | Dickens et al. | 361/679.02 |

* cited by examiner

*Primary Examiner* — Hoa C Nguyen
(74) *Attorney, Agent, or Firm* — Jackson IPG PLLC

(57) ABSTRACT

An inner wire capable of power integration and power division and adapted for use with an inverter having a casing and a circuit board includes a female connector and a male connector. The female and male connectors are each disposed in the casing and each include power lines, at least two signal lines, and a ground line. The power lines each have one end electrically connected to power connectors in pairs and the other end to power terminals respectively. The signal lines have one end electrically connected to two signal connectors respectively and the other end to signal terminals. The ground lines have one end electrically connected to ground connectors and the other end to ground terminals. The power terminals, signal terminals, and ground terminals are disposed in the male and female connectors. The signal connectors, ground connectors, and power connectors are electrically connected to the circuit board.

3 Claims, 2 Drawing Sheets

INNER WIRE FOR INVERTER

BACKGROUND OF THE INVENTION

1. Field of the Invention

The present invention relates to inner wires, and more particularly, to an inner wire capable of effecting power integration and power division concurrently and applicable to an inverter.

2. Description of the Prior Art

With green awareness being increasingly high, a wide variety of power generating devices have gone green. For example, power generating devices which provide people with electric power generated by a natural means, such as sunlight or wind.

Electric power generated from the aforesaid power generating devices undergoes conversion by an inverter before being delivered. Referring to FIG. 1, a conventional inverter 9 is connected to a female connector inner wire 91, a male connector inner wire 92, and a plurality of other wires (not denoted with a reference numeral). The conventional inverter 9 has the following drawbacks:

1. Requirements for the length of an inner wire vary from user to user. To meet the variable requirements, manufacturers usually have the longest male and female connector inner wires 92, 91 connected to the inverter 9. As a result, the male and female connector inner wires 92, 91 are too long and inconvenient and therefore are difficult to manufacture, deliver, and pack, not to mention that they occupy much space.

2. A fixing connector 93 has to be installed between the male and female connector inner wires 92, 91 and the casing (not denoted with a reference numeral) of the inverter 9 to fend off water and moisture. However, the installation of the fixing connector 93 incurs costs.

3. Since the male and female connector inner wires 92, 91 are directly electrically soldered to a circuit board (not shown) in the inverter 9, the inverter 9 will have to be discarded (i.e. causing a waste of materials) in order to change any one of the male and female connector inner wires 92, 91 in case of a failure thereof.

BRIEF SUMMARY OF THE INVENTION

In view of this, it is imperative to provide an inner wire capable of effecting power integration and power division concurrently and thereby overcoming drawbacks of related prior art.

Hence, the present invention provides an inner wire for an invert. The inner wire is for use with the inverter. The inverter has a casing and a circuit board disposed in the casing. The inner wire comprises a female connector and a male connector. The female connector comprises: a plurality of power lines having an end electrically connected to a power connector in pairs and another end electrically connected to a power terminal respectively; at least two signal lines having an end electrically connected to two signal connectors respectively and another end electrically connected to a signal terminal respectively; and a ground line having an end electrically connected to a ground connector and another end electrically connected to a ground terminal, wherein the power terminal, the signal terminal, and the ground terminal are disposed in the female connector. The male connector comprises: a plurality of power lines having an end electrically connected to a power connector in pairs and another end electrically connected to a power terminal respectively; at least two signal lines having an end electrically connected to two said signal connectors respectively and another end electrically connected to a signal terminal respectively; and a ground line having an end electrically connected to the ground connector and another end electrically connected to a ground terminal, wherein the power terminal, the signal terminal, and the ground terminal are disposed in the male connector, wherein the power terminals, the signal terminals, and the ground terminals are disposed in the male connector. The male and female connectors are disposed in the casing of the inverter, while the signal connectors, the ground connectors, and the power connectors of the male and female connectors are electrically connected to the circuit board in the inverter.

Accordingly, the inner wire of the present invention is not only capable of effecting power integration and power division concurrently, but also has the following effects:

1. With only the male and female connectors 7, 6 being exposed from the inverter 8, the inner wire is never too long or inconvenient; in other words, the inner wire of the present invention is not only easy to manufacture, deliver, and pack, but is also compact.

2. The male and female connectors 7, 6 are made of plastics and are hermetically sealed when coupled to the casing of the inverter; hence, the inner wire of the present invention dispenses with a conventional fixing connector and thus is cost-saving.

3. With the outdoor control cable 8A being an optional component for use with the inverters working in conjunction with the inner wire of the present invention, the outdoor control cable 8A can be changed in case of a failure thereof, and thus it is not necessary to discard the inverters and cause a waste of resources.

DETAILED DESCRIPTION OF THE EMBODIMENTS OF THE INVENTION

Figure 1:
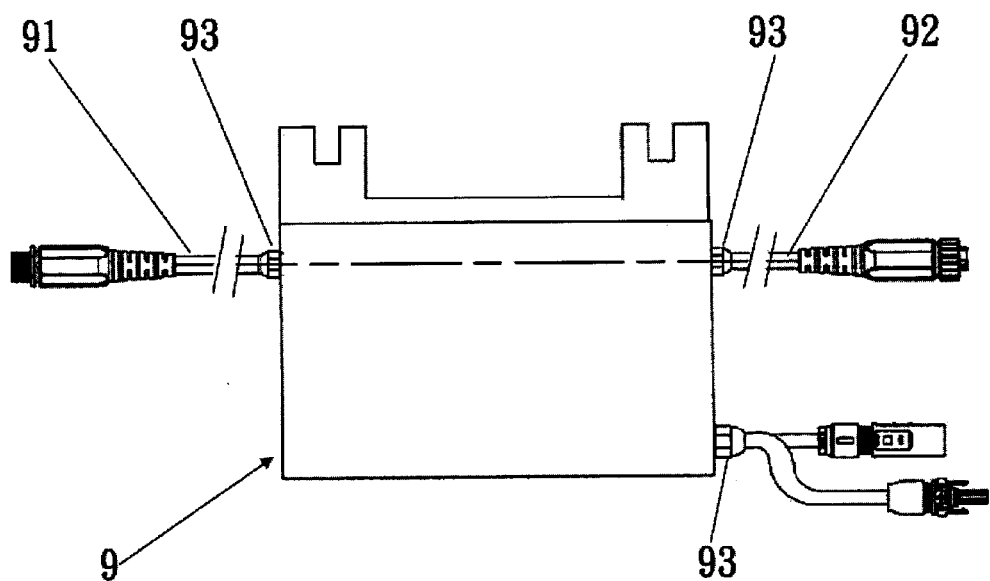
FIG. 1 (PRIOR ART) is a schematic view of an inner wire for a conventional inverter.
Figure 2:
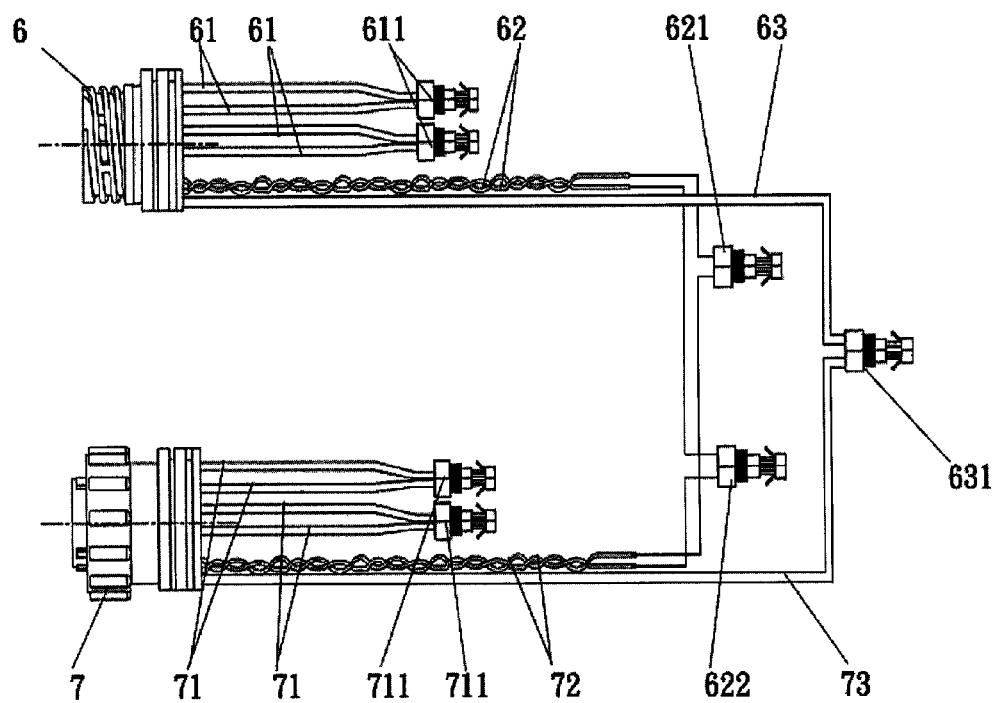
FIG. 2 is a schematic view of the structure of an inner wire according to the present invention.
Figure 3:
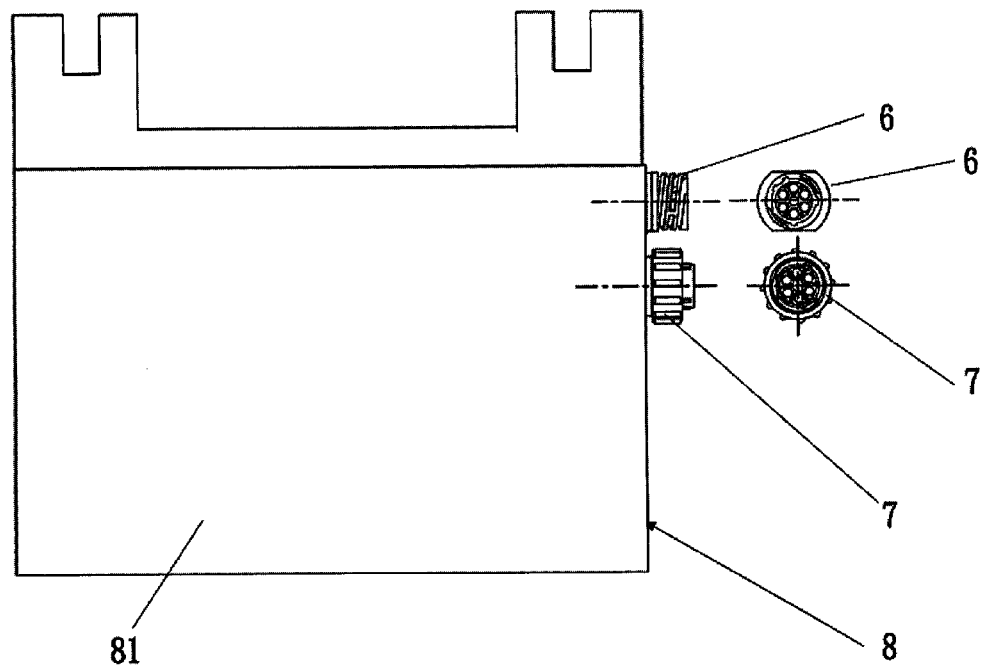
FIG. 3 is a schematic view of the structure of the inner wire disposed in an inverter according to the present invention.

The present invention provides an inner wire for an inverter. Referring to FIGS. 2, 3, the inner wire is for use with an inverter 8. The inverter 8 has a casing 81 and a circuit board (not shown) disposed in the casing 81. The inner wire comprises a female connector 6 and a male connector 7.

The female connector 6 comprises a plurality of power lines 61, at least two signal lines 62, and a ground line 63. The power lines 61 have one end electrically connected to a power connector 611, in pairs. The other end of the power lines 61 is electrically connected to a power terminal (not shown), respectively. The two signal lines 62 have one end electrically connected to two signal connectors 621, 622, respectively. The other end of the two signal lines 62 is electrically connected to a signal terminal (not shown), respectively. The ground line 63 has one end electrically connected to a ground connector 631 and the other end electrically connected to a ground terminal (not shown). The power terminals, the signal terminals, and the ground terminal are disposed in the female connector 6.

The male connector 7 comprises a plurality of power lines 71, at least two signal lines 72, and a ground line 73. The power lines 71 have one end electrically connected to a power connector 711, in pairs. The other end of the power lines 71 is electrically connected to a power terminal (not shown), respectively. The two signal lines 72 have one end electrically connected to the two signal connectors 621, 622, respectively. The other end of the two signal lines 72 is electrically connected to a signal terminal (not shown), respectively. The ground line 73 has one end electrically connected to the ground connector 631 and the other end electrically connected to a ground terminal (not shown). The power terminals, the signal terminals, and the ground terminal are disposed in the male connector 7.

As shown in FIG. 2, power integration starts from the left and ends on the right, because the terminals in the male and female connectors 7, 6 integrate the power lines 61, 71 into the power connectors 611, 711 and thereby effectuate power integration. Conversely, as shown in FIG. 2, power division starts from the right and ends on the left. For example, an electric power of 20 amperes generated by a power generating device is subjected to power division and thereby divided into two electric powers each of 10 amperes for use with a corresponding power-consuming apparatus (not shown).

Referring to FIG. 3, the male and female connectors 7, 6 are disposed in the casing 81 of the inverter 8, while the signal connectors 621, 622, the ground connector 631, and the power connectors 611, 711 of the male and female connectors 7, 6 are electrically connected to the circuit board in the inverter 8.

Furthermore, the two signal lines 72 of the male connector 7 are twisted together in pairs to form twisted-pair signal lines, such that interference between the signal lines can be further reduced. The two signal lines 62 of the female connector 6 are twisted together in pairs to form twisted-pair signal lines, such that interference between the signal lines can be further reduced. Also, both the male connector 7 and the female connector 6 are made of plastics are thus are waterproof and moisture-free with respect to the casing 81 of the inverter.

Figure 4:
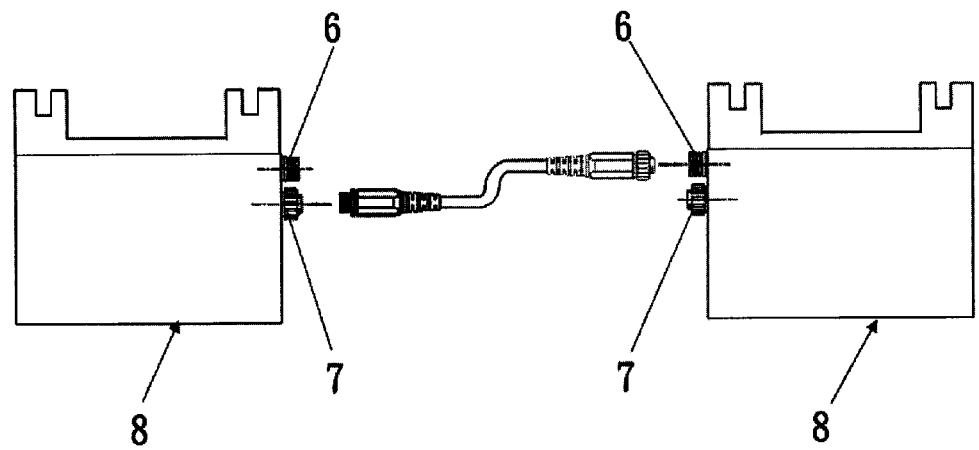
FIG. 4 is a schematic view of an outdoor control cable connected between two inverters according to the present invention.

Referring to FIG. 4, the inner wire of the present invention is specially designed in a manner that only the male and female connectors 7, 6 are exposed from the casing 81 of the inverter when the inner wire is installed in the casing 81 of the inverter 8. By contrast, a conventional inner wire is long and lacks ease of use according to the prior art. Furthermore, the inner wire of the present invention has another advantage: an outdoor control cable 8A disclosed in the patent application entitled Outdoor Control Cable previously filed by the applicant of the present invention can be connected between two said inverter 8 of the present invention. The outdoor control cable 8A has one end electrically connected to the male connector 7 of one of the inverters 8 and the other end electrically connected to the female connector 6 of the other one of the inverts 8, thereby enabling power integration and power division.

In addition to effecting power integration and power division concurrently, the present invention has the following features and effects:

1. With only the male and female connectors 7, 6 being exposed from the inverter 8, the inner wire is never too long or inconvenient; in other words, the inner wire of the present invention is not only easy to manufacture, deliver, and pack, but is also compact.

2. The male and female connectors 7, 6 are made of plastics and are hermetically sealed when coupled to the casing 81 of the inverter; hence, the inner wire of the present invention dispenses with a conventional fixing connector and thus is cost-saving.

3. With the outdoor control cable 8A being an optional component for use with the inverters 8 working in conjunction with the inner wire of the present invention, the outdoor control cable 8A can be changed in case of a failure thereof, and thus it is not necessary to discard the inverters 8 and cause a waste of resources.

The above description is directed to preferred embodiments of the present invention only, but is not intended to be restrictive of the claims of the present invention. All equivalent structural changes to the aforesaid preferred embodiments of the present invention based on the contents of the drawings and specification of the present invention should be regarded as a portion of the technical features recited in the claims of the present invention.

What is claimed is:

1. An inner wire for use with an inverter, the inverter having a casing and a circuit board disposed in the casing, the inner wire comprising:
    a female connector comprising:
        a plurality of power lines having an end electrically connected to a power connector in pairs and another end electrically connected to a power terminal respectively;
        at least two signal lines having an end electrically connected to two signal connectors respectively and another end electrically connected to a signal terminal respectively; and
        a ground line having an end electrically connected to a ground connector and another end electrically connected to a ground terminal,
        wherein the power terminal, the signal terminal, and the ground terminal are disposed in the female connector; and
    a male connector comprising:
        a plurality of power lines having an end electrically connected to a power connector in pairs and another end electrically connected to a power terminal respectively;
        at least two signal lines having an end electrically connected to two said signal connectors respectively and another end electrically connected to a signal terminal respectively; and
        a ground line having an end electrically connected to the ground connector and another end electrically connected to a ground terminal,
        wherein the power terminal, the signal terminal, and the ground terminal are disposed in the male connector,
    wherein the male and female connectors are disposed in the casing of the inverter, while the signal connectors, the ground connectors, and the power connectors of the male and female connectors are electrically connected to the circuit board in the inverter.

2. The inner wire of claim 1, wherein two said signal lines of the male connector are twisted together in pairs, and two said signal lines of the female connector are twisted together in pairs.

3. The inner wire of claim 1, wherein the male connector and the female connector are made of plastics and thus are waterproof and moisture-free with respect to the casing of the inverter.

* * * * *